(12) United States Patent
Milazzo

(10) Patent No.: US 6,448,841 B1
(45) Date of Patent: Sep. 10, 2002

(54) EFFICIENCY CHARGE PUMP CIRCUIT

(75) Inventor: Ciro W. Milazzo, Santa Cruz, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/302,828

(22) Filed: Apr. 30, 1999

Related U.S. Application Data

(60) Provisional application No. 60/083,992, filed on May 1, 1998.

(51) Int. Cl.[7] .................................................. G05F 1/10
(52) U.S. Cl. ............................ 327/536; 327/537; 363/59
(58) Field of Search ................................ 327/534, 536, 327/537; 307/110; 363/59, 60

(56) References Cited

U.S. PATENT DOCUMENTS

| | | | |
|---|---|---|---|
| 4,670,861 A | | 6/1987 | Shu et al. ..................... 365/181 |
| 4,792,705 A | | 12/1988 | Ouyang et al. .......... 307/296 R |
| 4,897,774 A | | 1/1990 | Bingham et al. .............. 363/61 |
| 4,922,403 A | * | 5/1990 | Feller ........................... 363/60 |
| 5,196,739 A | | 3/1993 | Sandhu et al. ............ 307/296.1 |
| 5,301,097 A | | 4/1994 | McDaniel ..................... 363/60 |
| 5,422,529 A | | 6/1995 | Lee .............................. 327/536 |
| 5,422,583 A | * | 6/1995 | Blake et al. .................. 327/534 |
| 5,422,590 A | | 6/1995 | Coffman et al. ............. 327/537 |
| 5,434,526 A | * | 7/1995 | Tanigashira et al. ......... 327/534 |
| 5,475,335 A | | 12/1995 | Merrill et al. ............... 327/536 |
| 5,481,221 A | | 1/1996 | Gariboldi et al. ........... 327/536 |
| 5,534,821 A | | 7/1996 | Akiyama et al. ............... 331/8 |
| 5,581,455 A | | 12/1996 | Rossi et al. .................... 363/60 |
| 5,592,370 A | | 1/1997 | Rogers ........................... 363/60 |
| 5,612,861 A | | 3/1997 | Zhong et al. .................. 363/59 |
| 5,682,050 A | * | 10/1997 | Williams ..................... 327/537 |
| 6,020,779 A | * | 2/2000 | Udo ............................ 327/537 |

* cited by examiner

Primary Examiner—Timothy P. Callahan
Assistant Examiner—An T. Luu
(74) Attorney, Agent, or Firm—W. Daniel Swayze, Jr.; W. James Brady; Frederick J. Telecky, Jr.

(57) ABSTRACT

The present invention utilizes a plurality of transistors configured such that the drain/well diode of the PMOS switch is not forward biased during any part of the charge pump cycle. In one embodiment a plurality of transistors are coupled between the drain, source and well of the PMOS switch such that the well of the PMOS switch is connected to a voltage that is one base-emitter voltage drop (Vbe) less than the higher of either the source voltage or the drain voltage. Since the well is always a single Vbe below the higher of the source voltage or the drain voltage, the gate-well diodes of the PMOS switches are prevented from becoming forward biased, thereby reducing current drain and resulting in improved efficiency of the charge pump. A further embodiment utilizes a plurality of switches and a specific switching sequence such that certain switches at a first side of the pump capacitors are allowed to float while certain switches at the second side of the pump capacitors are being configured, then once the switches at the second side of the pump capacitors are configured, the switches at the first side of the pump capacitors are used to transfer the charge from one capacitor to another. Accordingly, the drain-well diode of the PMOS switches are not forward biased during the charge pump cycles.

8 Claims, 3 Drawing Sheets

EFFICIENCY CHARGE PUMP CIRCUIT

CROSS REFERENCE TO RELATED APPLICATIONS

This application claims priority under 35 U.S.C. §119(e) to provisional patent application Ser. No. 60/083,992 filed May 1, 1998; the disclosure of which is hereby incorporated by reference.

STATEMENT REGARDING FEDERALLY SPONSORED RESEARCH OR DEVELOPMENT

Not Applicable

BACKGROUND OF THE INVENTION

Charge pumps are known in the art. A charge pump comprises a series of charge storage and transfer elements coupled together which increase the output voltage by a quantity of approximately 1*Vin. The charge storage elements are coupled from one stage to the next by the transfer element such as PMOS switches. A major source of current drain internal to the charge pump can be forward biasing of the gate-well diode of the PMOS switches during the charging and transfer cycles. In a standard N-Well CMOS process, PMOS transistors are fabricated in N-type wells in a P-type substrate. PMOS transistors could perform the switching functions, but parasitic PNP bipolar transistors formed by the P+source/N-Well/P-substrate and the P+drain/N-Well/P-substrate can bleed charge into the P-substrate faster than it can be put into the pump. If this happens it will render the charge pump useless. It would be desirable to reduce the current drain resulting from the forward biasing of the gate-well diode of the PMOS switches in order to improve the efficiency of the charge pump.

BRIEF SUMMARY OF THE INVENTION

The present invention utilizes a plurality of transistors configured such that the gate-well diode of the PMOS switch is not forward biased during any part of the charge pump cycle. In one embodiment the plurality of transistors are coupled between the drain, source and well of the PMOS switch such that the well of the PMOS switch is connected to a voltage that is one base-emitter voltage drop (Vbe) less than the higher of either the source voltage or the drain voltage. Since the well is always a single Vbe below the higher of the source voltage or the drain voltage, the gate-well diodes of the PMOS switches are prevented from becoming forward biased, thereby reducing current drain and resulting in improved efficiency of the charge pump. A further embodiment utilizes a plurality of switches and a specific switching sequence such that certain switches at a first side of the pump capacitors are allowed to float while certain switches at the second side of the pump capacitors are being configured, then once the switches at the second side of the pump capacitors are configured, the switches at the first side of the pump capacitors are used to transfer the charge from one capacitor to another. Accordingly, the drain-well diode of the PMOS switches are not forward biased during the charge pump cycles.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1:
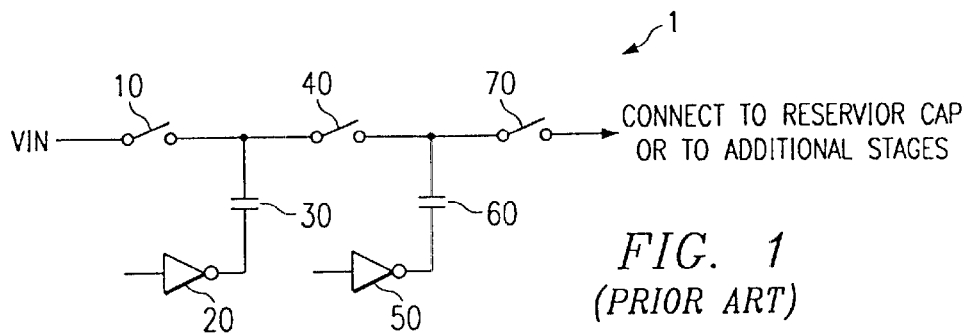
FIG. 1 is a diagram of a prior art charge pump.

A charge pump comprises a series of charge storage and transfer elements, each increasing the output voltage by a quantity of 1*Vin when integrated over many complete clock cycles. As shown in FIG. 1 a prior art charge pump 1 comprises a first driver 20 which drives a first lead of a first capacitor 30. The second lead of the capacitor 30 is connected between a first switch 10 and a second switch 40. First switch 10 connects Vin to the second lead of capacitor 30. A second driver 50 drives a first lead of second capacitor 60. The second lead of capacitor 60 is connected between the second switch 40 and a third switch 70. Second switch 40 connects between the second end of capacitor 30 and the second lead of capacitor 60. A third switch 70 is connected between the second lead of capacitor 60 and to either a reservoir cap or to additional stages (not shown).

Operation of the charge pump can be described as including eight steps. At step 1 switch 40 is open. In the next step (step 2) an input to driver 20 is at a high voltage level, resulting in the output of driver 20 being low. In step 3 the input to driver 50 is set high, thus driver 50 is outputting a low voltage. Next switch 10 is closed thereby allowing first capacitor 30 to be charged to a value of approximately Vin.

Next, at step 5, switch 10 is opened. At step 6 the input to driver 20 is then set low, resulting in the output of the driver becoming high (approximately five volts). Next the input to driver 50 is set high, causing driver 50 to output a low voltage. At step 8 switch 40 is then closed which in turn level shifts the voltage at the second lead of capacitor 30 by five volts to approximately ten volts with respect to Vss. This process is repeated such that after several cycles capacitor 60 will be charged to a voltage of approximately twice Vin. Switch 70 is synchronized with switch 10, such that switch 70 transfers charge to additional pump stages for further voltage multiplication or out of the charge pump to a reservoir capacitor.

This style charge pump cannot be made in a standard CMOS integrated circuit process because there are not any suitable devices to build switches 10, 40, and 70.

Figure 2A:
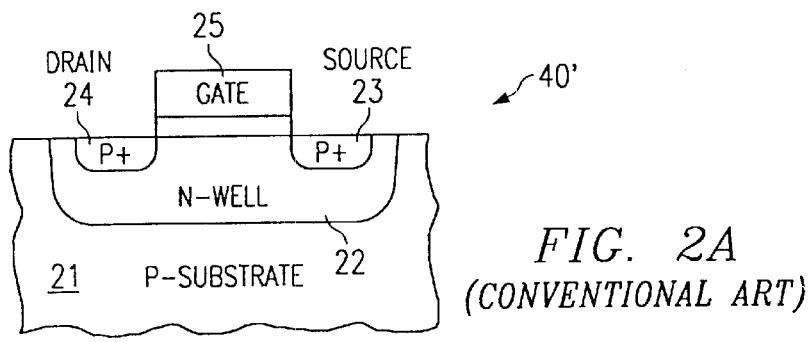
FIG. 2A is a diagram of a cross-sectional view of a CMOS device fabricated in a conventional process.
Figure 2B:
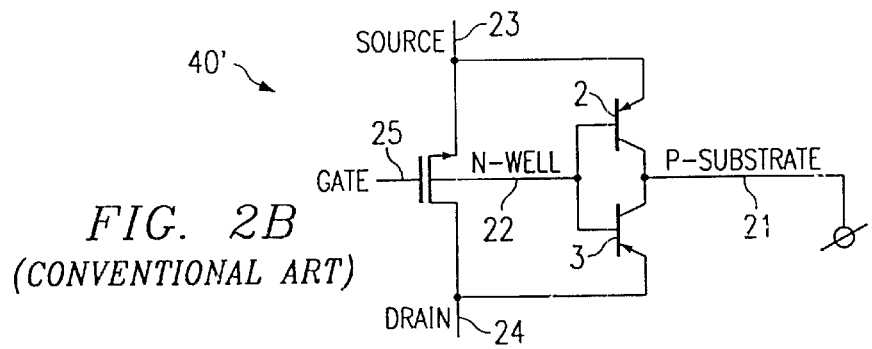
FIG. 2B is a schematic of the device of FIG. 2A.

FIG. 2A shows a cross sectional view of a typical PMOS transistor formed in a CMOS process. FIG. 2B shows the schematic equivalent of the transistor of FIG. 2A. There inherently exists a pair of parasitic transistors 2 and 3. If these parasitic transistors turn on, they will act to bleed charge off the charge pump into the P-substrate 21. In order to prevent this from occurring, the voltage of the N-well 22 must always be the same or higher than the voltage on either the P+source 23 or the P+drain 24. In a conventional charge pump there is no suitable terminal to connect the N-well to.

Figure 2C:
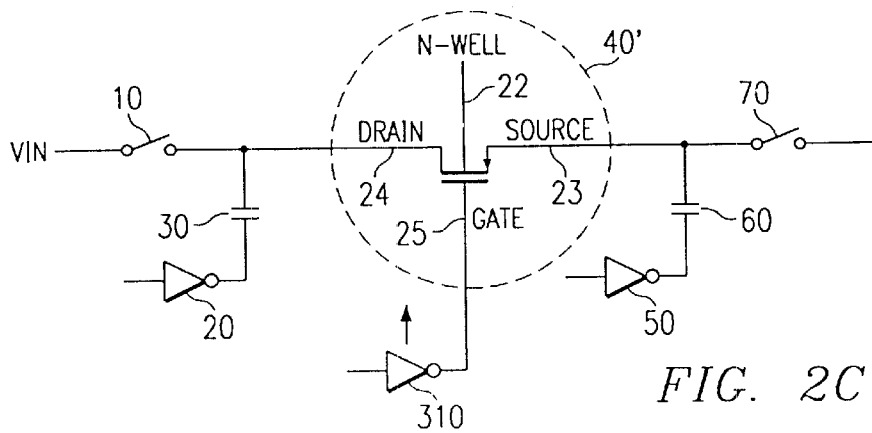
FIG. 2C is a schematic diagram of a charge pump stage including a PMOS transistor switch.

Referring now to FIG. 2C, the charge pump of FIG. 1 is shown with switch 40 replaced by the CMOS transistor 40' of FIG. 2. Referring to the 8 steps in the basic operation of the charge pump of FIG. 1 described above, it can be seen that N-Well 22 may not be connected to either the Source terminal 23 or to the Drain terminal 24.

At step 3, when driver 50 output is set high, the voltage on Source 23 is higher than the voltage on Drain 24. If the N-Well were connected to the Drain, then the parasitic PNP from the Source would conduct charge off of capacitor 60 into the substrate.

At step 7, when driver 20 output is set high and driver 50 output is set low, the voltage on Source 23 is lower than the voltage on Drain 24. If the N-Well were connected to the Source, then the parasitic PNP from the Drain would conduct charge off of capacitor 30 into the substrate.

Figure 3A:
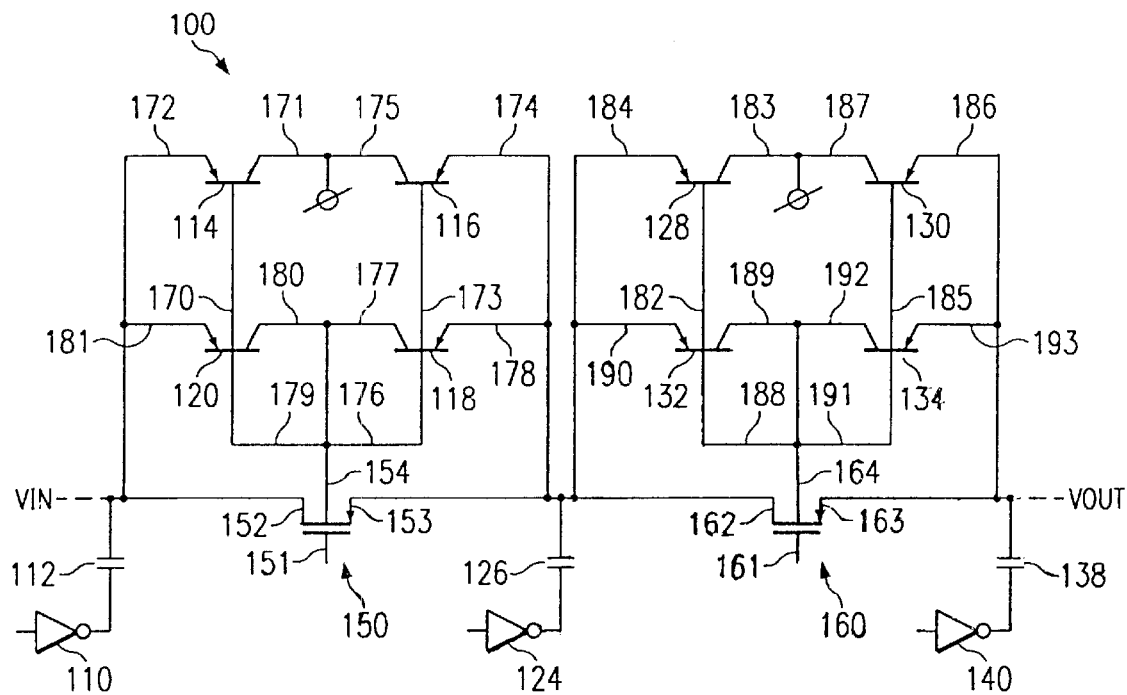
FIG. 3A is a diagram of two stages of a charge pump of the present invention.
Figure 3B:
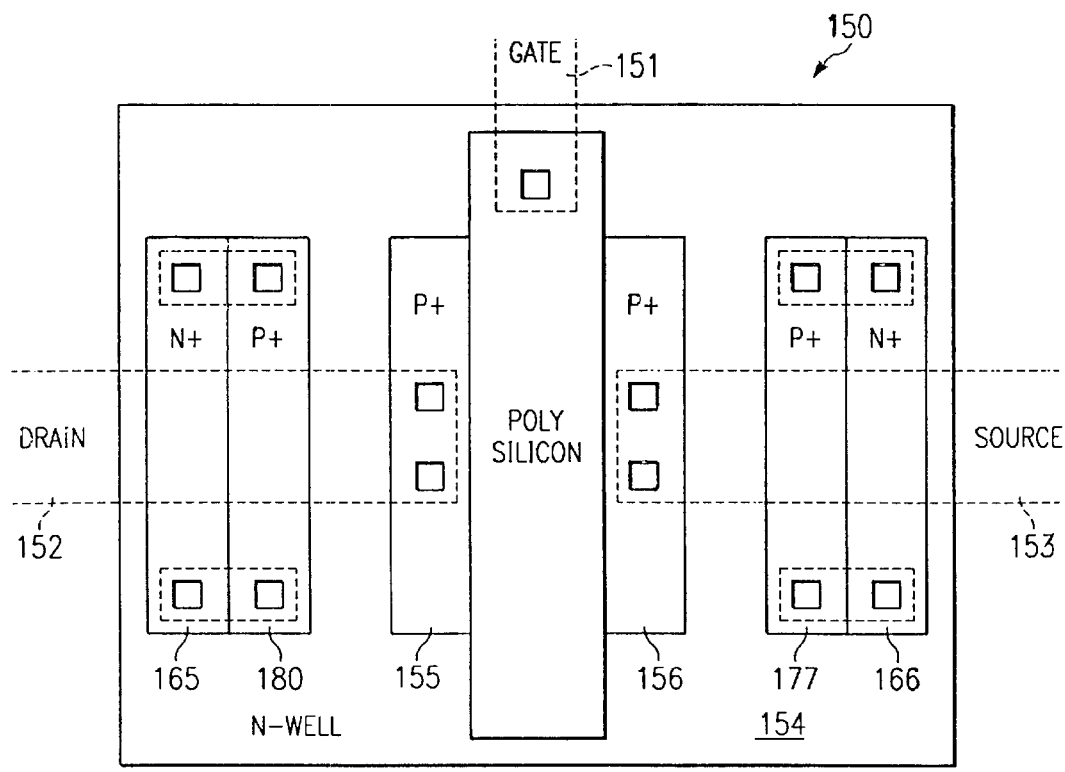
FIG. 3B is a top view of the physical layout of PMOS transistor switch.
Figure 3C:
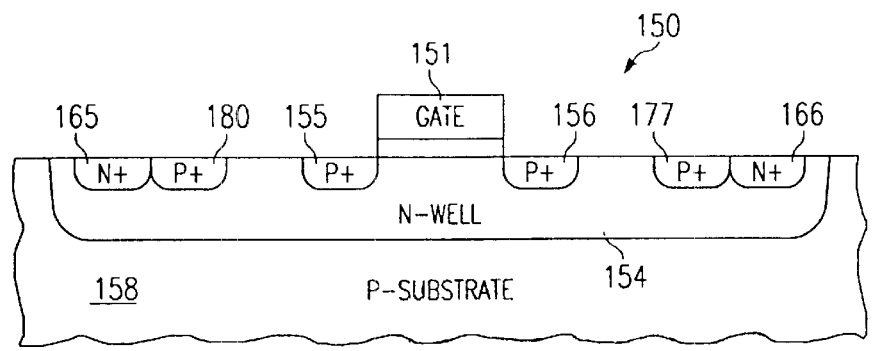
FIG. 3C is a cross-sectional view of the transistor switch of FIG. 3B.

Referring now to FIGS. 3A–3C, a first embodiment of an improved efficiency charge pump 100 of the present invention is shown. In this embodiment a first plurality of lateral PNP transistors are connected between the gate, the source and the well of first switch 150. A first PNP transistor 114 is not intentionally constructed, but rather is a resulting parasitic transistor. This parasitic transistor is configured such that the base 170 is connected to the well 154 of switch 150, the emitter 172 is connected to the source 152 of switch 150 and the collector 171 connected to the substrate of the CMOS integrated circuit, which is at zero volt potential. As such, parasitic transistor 114 operates as an emitter follower circuit, wherein a change in base voltage appears as an equal change across the emitter. A second resulting parasitic transistor 116 is depicted as being configured such that the base 173 is connected to the well 154 of switch 150, the emitter 174 connected to the drain 153 of switch 150 and the collector 175 is connected to the well 154 of switch 150. Second parasitic transistor 116 also operates as an emitter follower. A first lateral PNP transistor 118 is arranged with the base 176 connected to the well 154 of switch 150, the emitter 178 connected to the drain 153 of switch 150 and the collector 177 connected to the well 154 of switch 150. A second lateral PNP transistor 120 has its base 179 connected to the well 154 of switch 150, its emitter 181 connected to the source 152 of switch 150 and its collector connected to the well of switch 150. First and second lateral transistors 118 and 120 are configured as diodes. With such a configuration, the well 154 of PMOS switch 150 is connected to a voltage that is one base-to emitter voltage ($V_{be}$) drop below the higher of either the drain or the source voltage. Accordingly, with this arrangement of lateral PNP transistors and parasitic transistors configured as described above the drain-well diode of PMOS switch 150 is kept from becoming forward biased during the charge pump cycles.

A similar configuration is provided on the PMOS switches of the other stages, as shown with switch 160. A second plurality of parasitic transistors 128 and 130 are depicted as being connected between the gate, the source and the well of second switch 160. A first parasitic transistor 128 of the second plurality of parasitic transistors is represented wherein the base 182 is connected to the well 164 of switch 160, the emitter 184 is connected to the source 162 of switch 160 and the collector 183 connected to the substrate of the CMOS integrated circuit, which is at zero volt potential. The second parasitic transistor 130 is portrayed wherein the base 185 is connected to the well 164 of switch 160, the emitter 186 is connected to the drain 163 of switch 160 and the collector 192 is connected to the well 164 of switch 160. A first lateral PNP transistor 132 of the second plurality of transistors is arranged with the base 188 connected to the well 164 of switch 160, the emitter 190 connected to the source 162 of switch 160 and the collector 189 connected to the well 164 of switch 160. A second lateral PNP transistor 134 of the second plurality of transistors has its base 191 connected to the well 164 of switch 160, its emitter 193 connected to the drain 163 of switch 160 and its collector 192 connected to the well 164 of switch 160. With such a configuration, the well 164 is connected to a voltage that is one base-to emitter voltage drop below the higher of either the drain voltage or the source voltage, therefore the drain-well diode of the PMOS switch 160 is not forward biased during any portion of the charge pump cycle.

Referring to FIG. 3B a top view of a a PMOS transistor switch 150 with lateral PNP transistors 118 and 120 and parasitic substrate PNP transistors 114 and 116 is shown. Switch 150 is constructed in a standard CMOS integrated circuit process. FIG. 3C shows a cross section of the transistor in FIG. 3B. P+ diffusions 155 and 156, polysilicon gate 151 and N-Well 154 form the conventional PMOS transistor. P+ diffusion 155 is the drain of 150; it is also the emitter of lateral PNP 120 and the emitter of substrate PNP 114. P+ diffusion 156 is the source of 150; it is also the emitter of lateral PNP 118 and the emitter of substrate PNP 116. N-Well 154 is the base of lateral PNPs 120 and 118, and the base of substrate PNPs 114 and 116. P+ diffusion 180 is the collector of 120. P+ diffusion 177 is the collector of 118. N+ diffusions 165 and 166 bring collectors 180 and 177 into electrical contact with N-Well 154. P– substrate 158 is the collector of substrate PNP 114 and the collector of substrate PNP 116.

Referring back to FIG. 3A, in operation the charge pump 100 functions as follows. Initially the input to driver 110 is at a high voltage level, resulting in the output of driver 110 being low. The gate 151 of first PMOS switch 150 is low effectively isolating the source 152 from the drain 153. This arrangement allows first capacitor 112 to be charged to a value of approximately Vin. The input to driver 110 is then set low, resulting in the output of the driver becoming high (approximately five volts) which in turn level shifts the voltage at the second lead of capacitor 112 by five volts to approximately ten volts with respect to Vss.

The gate 151 of PMOS switch 150 is then driven high, resulting in electrical communication between the drain and the source. Second driver 124 has its input driven high, resulting in the output providing a low voltage to the first lead of second capacitor 126. As a result, second capacitor 126 is charged to approximately ten volts. The gate 151 of PMOS switch 150 is then driven low, thus isolating the source 152 from the drain 150. The input to driver 124 is then driven low, level shifting the voltage at second capacitor 126 to approximately 15 volts.

The PMOS switches are configured with a plurality of lateral PNP transistors to connect the respective wells of the PMOS switches to 1 Vbe below the higher of either the drain voltage or the source voltage thereby preventing the gate-well diode from being forward biased during the charge pump cycles, resulting in less current drain and improved efficiency. The charging of the well is not a significant drain on the charge pump because the well capacitance is small and because the well tends to charge to its highest potential and stay there.

Figure 4:
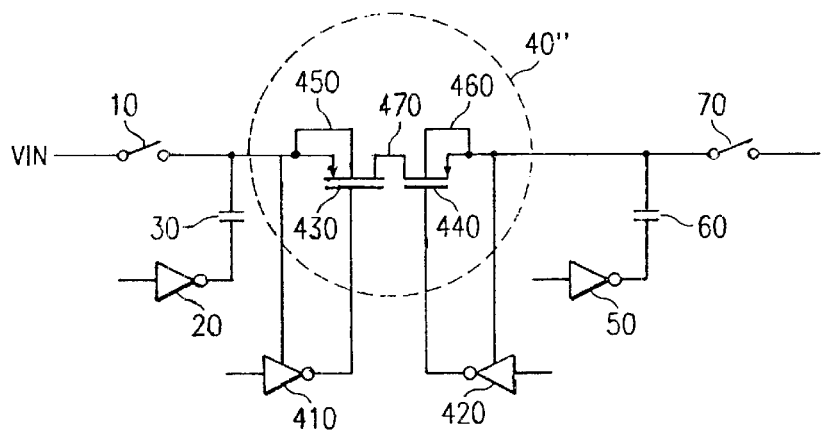
FIG. 4 is a schematic diagram of a charge pump stage using a double PMOS transistor switch.

Using a double transistor switch design, in which each switch is built from two PMOS transistors in series, can surmount this situation. FIG. 4. shows the charge pump of FIG. 1, with switch 40 replaced by a double transistor PMOS switch 40" made up of transistors 430 and 440. The control signals to level shifting gate drivers 410 and 420 are phased so that the parasitic PNP transistors can never turn on.

During the time when node 460 is at a higher voltage than node 450, transistor 430 is turned on so that there is conduction between its Drain terminal 470 and its Source terminal 450. This ensures that the Drain terminal voltage 470 will be no higher than the N-Well terminal voltage 450, and no parasitic PNP transistor action will occur. Similarly, during the time when node 450 is at a higher voltage than node 460, transistor 440 is turned on so that there is conduction between its Drain terminal 470 and its Source terminal 460. This ensures that the Drain terminal voltage 470 will be no higher than the N-Well terminal voltage 460, and no parasitic PNP transistor action will occur.

A trade-off when utilizing the double switch implementation comes from level shifting gate drivers 410 and 420. During each cycle of the charge pump, the gates of PMOS transistors 430 and 440 must be driven low to turn the switch on, and the gates must be driven high to turn the switch off. To drive the gates of the PMOS transistors high, the level shifter must use current from a high voltage source. The only available high voltages for the level shifters to use are the internal charge pump nodes 450 and 460. Any current drawn from nodes 450 and 460 by the level shifters 410 and 420 is a loss of charge that would otherwise be transferred to the next stage of the charge pump, and hence results in a loss of overall efficiency for the charge pump. The use of two PMOS transistors instead of one to form the switch means that the losses will automatically be doubled. This loss is compounded by the larger size required for the PMOS transistors in the double switch design. Since the two switch transistors are in series with each other, each transistor must be twice as large as it would otherwise be in a single transistor design, in order to obtain the required conduction between nodes 450 and 460 when the switch is on. Since the transistors are twice as large, they each have twice as much gate capacitance, which needs to be charged by the level shifting gate drivers 410 and 420. Thus the overall loss of efficiency in a double transistor switch charge pump is four times greater than the loss of efficiency would be in a corresponding single switch charge pump.

Figure 5:
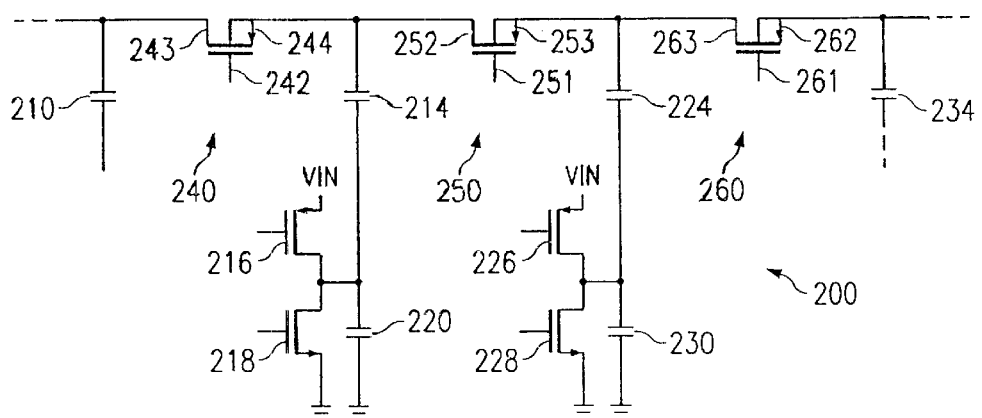
FIG. 5 is a schematic diagram of an additional embodiment of a charge pump.

Referring now to FIG. 5, a second embodiment of an improved efficiency charge pump 200 is shown. In this embodiment a plurality of switches and a specific switching sequence are utilized which prevent the forward biasing the drain-well diode of the PMOS switch during any part of the charge pump cycle. This is accomplished by allowing selected switches at a first side of the pump capacitors to float while selected switches at a second side of the capacitors are being configured and then using the selected switches at the first side of the pump capacitor to transfer charge.

Switches 216, 226, 240, 250, and 260 are constructed from PMOS transistors, and these switches are opened when their gates are set to a high voltage and closed when their gates are set to a low voltage. Switches 218 and 228 are constructed from NMOS transistors, and these switches are opened when their gates are set to a low voltage and closed when their gates are set to a high voltage.

The charge pump 200 is configured wherein a first switch 216 and a second switch 218 drive a first lead of a first pump capacitor 214. The second lead of the capacitor 214 is connected to a well and drain 244 of third switch 240 and to the source 252 of forth switch 250. The well and drain 253 of switch 250 are connected to the second lead of a second pump capacitor 224. The first lead of second capacitor 224 is connected to switch 226 and switch 228.

In operation the charge pump 200 functions as follows. Initially, switches 216, 226 and 250 are open by having their respective gates set to a low voltage. Switch 228 is set open, switch 240 is closed, while switches 218 and 260 are closed. When the switches are configured as described above charge has just been transferred from capacitor 210 through switch 240 to capacitor 214 and from capacitor 224 to capacitor 234 through switch 260. Capacitor 214 is effectively isolated from capacitor 224 since switch 250 is open.

The next step is to transfer charge from capacitor 214 to capacitor 224. Switches 240 and 260 are opened. The opening of switches 240 and 260 isolate capacitor 210 from capacitor 214 and capacitor 224 from capacitor 234 respectively. Switch 218 is opened, switch 250 is closed and switch 228 is closed. When switch 250 is closed the voltage at the top of capacitor 214 will be equalized with the voltage at the top of capacitor 224.

Switch 216 is then closed. When switch 216 is closed charge will transfer from capacitor 214 to capacitor 224, and the voltage across switch 250 will be determined by the relative impedance of switch 250 relative to the impedance of switch 216 plus the impedance of switch 228.

Capacitors 220 and 230 help to moderate the voltage swings when the PMOS switches are opened. These capacitors are kept small to minimize charge back flushed into them from capacitor 224 and capacitor 234 when switches 20 and 260 are respectively closed.

This arrangement prevents the gate-well diode of the PMOS switches from becoming forward biased since the voltage at the top of capacitor 224 will always be higher than the voltage at the top of capacitor 214 under the conditions described above.

Having described preferred embodiments of the invention it will now become apparent to those of ordinary skill in the art that other embodiments incorporating these concepts may be used. Accordingly, it is submitted that the invention should not be limited to the described embodiments but rather should be limited only by the spirit and scope of the appended claims.

I claim:

1. A charge pump comprising:
   a first capacitor having a first contact and a second contact;
   a first switch having a drain in electrical communication with the second contact of said first capacitor, a source, a well, and a gate operative to selectively provide electrical communication between said drain and said source and wherein said drain and said well form a drain-well diode;
   a second compacitor having a first contact and a second contact, the second contact in electrical communication with said source and well of said first switch;
   a second switch having a first contact in electrical communication with a first reference voltage, a second contact in electrical communication with the first contact of said first capacitor and a gate contact operative to selectively provide electrical communication between said first contact and said second contact of said second switch;
   a third switch having a first contact in electrical communication with the said first reference voltage, a second contact in electrical communication with the first contact of said second capacitor and a gate contact operative to selectively provide electrical communication between said first contact and said second contact of said third switch;

a fourth switch having a first contact in electrical communication with a second reference voltage, a second contact in electrical communication with the first contact of said first capacitor and a gate contact operative to selectively provide electrical communication between said first contact and said second contact of said fourth switch; and a fifth switch having a first contact in electrical communication with the second reference voltage, a second contact in electrical communication with the first contact of said second capacitor and a gate contact operative to selectively provide electrical communcation between said first contact and said second contact of said fifth switch, wherein said second switch, said third switch, said fourth switch and said fifth switch are operative to prevent the drain-well diode of said first switch from becoming forward biased.

2. The charge pump of claim 1 further comprising a third capacitor having a first contact and a second contact, the first contact in electrical communication with the first contact of said first capacitor, the second contact in electrical communication with said second reference voltage.

3. The charge pump of claim 1 further comprising a fourth capacitor having a first contact and a second contact, the first contact in electrical communication with the first contact of said second capacitor, the second contact in electrical communication with said second reference voltage.

4. The charge pump of claim 1, wherein said first, second, third and fifth switches are opened and said fourth switch is closed for charging to said first capacitor, discharging said second capacitor and isolating said first capacitor from said second capacitor, then said fourth switch is opened and said first and fifth switches are closed for equalizing voltage at said first and second capacitors, and then said second switch is closed for transferring charge from said first capacitor to said second capacitor.

5. A charge pump comprising:
a first capacitor;
a first transistor in electrical communication with said first capacitor;
a second capacitor in electrical communication with said first transistor;
a first switching device in electrical communication with said first capacitor, wherein said first switching device comprises a second transistor in electrical communication with said first capacitor and a first reference voltage, and a third transistor in electrical communication with said first capacitor and a second reference voltage; and a second switching device in electrical communication with said second capacitor, wherein said second switching device comprises a fourth transistor in electrical communication with said second capacitor and said first reference voltage, and a fifth transistor in electrical communication with said second capacitor and said second reference voltage;

wherein said first transistor floats while said first and second switching devices are set for allowing charge transfer and then said first transistor is switched to transfer charge from said first capacitor to said second capacitor without the drain-well diode of said first transistor becoming forward biased;

whereby said first, second, third and fifth transistors are opened and said fourth transistor is closed for charging said first capacitor, discharging said second capacitor and isolating said first capacitor from said second capacitor, then said fourth transistor is opened and said first and fifth transistors are closed for equalizing voltage at said first and second capacitors, and then said second transistor is closed for transferring charge from said first capacitor to said second capacitor.

6. A method for switching a charge pump circuit having a first transistor, first and second capacitors in electrical communication with the first transistor, and first and second switching devices in electrical communication with said first and second capacitors respectively, the method comprising the steps of:

(a) setting the first transistor and the first and second switching devices to charge the first capacitor and discharge the second capacitor while isolating said first capacitor from said second capacitor, wherein said step (a) comprises the steps of
(i) opening the first transistor, and second and third transistors of the first switching device; and
(ii) opening a fourth transistor of the second switching device;

(b) switching the first transistor and the second switching device to equalize voltage at the first and second capacitors; and (c) switching the first switching device to transfer charge from the first capacitor to the second capacitor.

7. The method according to calim 6, wherein said step (b) comprises the step of closing the first transistor and a fifth transistor of the second switching device.

8. The method according to claim 7, wherein said step (c) comprises the step of closing the second transistor of the first switching device.

* * * * *